United States Patent
Auer et al.

(10) Patent No.: US 8,682,844 B2
(45) Date of Patent: Mar. 25, 2014

(54) METHOD AND APPARATUS FOR COLLISION RESOLUTION IN AN ASYNCHRONOUS DATABASE SYSTEM

(75) Inventors: Wolfgang F.X. Auer, Berlin (DE); Juergen W. Aurisch, Berlin (DE); Markus J. Stausberg, Berlin (DE)

(73) Assignee: SAP AG, Walldorf (DE)

( * ) Notice: Subject to any disclaimer, the term of this patent is extended or adjusted under 35 U.S.C. 154(b) by 2611 days.

(21) Appl. No.: 11/045,547

(22) Filed: Jan. 28, 2005

(65) Prior Publication Data

US 2006/0173850 A1  Aug. 3, 2006

(51) Int. Cl.
G06F 17/30 (2006.01)

(52) U.S. Cl.
USPC .......................................................... 707/609

(58) Field of Classification Search
USPC ................................ 707/2, 203, 609; 709/206
See application file for complete search history.

(56) References Cited

U.S. PATENT DOCUMENTS

| | | | |
|---|---|---|---|
| 6,058,401 A * | 5/2000 | Stamos et al. | 707/201 |
| 6,138,120 A * | 10/2000 | Gongwer et al. | 707/10 |
| 6,507,865 B1 * | 1/2003 | Hanson et al. | 705/36 R |
| 6,615,223 B1 * | 9/2003 | Shih et al. | 707/201 |
| 6,892,210 B1 * | 5/2005 | Erickson et al. | 707/201 |
| 7,013,316 B1 * | 3/2006 | Hansen et al. | 1/1 |
| 7,092,973 B2 * | 8/2006 | Muehl et al. | 707/203 |
| 7,149,759 B2 * | 12/2006 | Morrison | 707/201 |
| 7,222,139 B2 * | 5/2007 | Mau | 707/622 |
| 2004/0044702 A1 * | 3/2004 | Ferreira Alves et al. | 707/203 |
| 2004/0205263 A1 * | 10/2004 | Sivaraman et al. | 710/21 |
| 2005/0080896 A1 * | 4/2005 | Wu | 709/224 |
| 2006/0112150 A1 * | 5/2006 | Brown et al. | 707/201 |
| 2006/0248085 A1 * | 11/2006 | Sack et al. | 707/9 |

* cited by examiner

*Primary Examiner* — Robert Beausoliel, Jr.
*Assistant Examiner* — Noosha Arjomandi
(74) *Attorney, Agent, or Firm* — Buckley, Maschoff & Talwalkar LLC

(57) ABSTRACT

Pursuant to some embodiments, a system, method, apparatus, means and computer program code for resolving conflicts in a database system are provided where the system includes a plurality of client databases and a master database, each client database having a subset of data from the master database. Pursuant to some embodiments, conflicts are resolved by receiving a data change request message from a requesting client database, the data change request message including change information identifying a proposed change, row identification information, and a before image, and comparing the row identification information and the before image to corresponding information in the master database to identify a potential conflict.

15 Claims, 16 Drawing Sheets

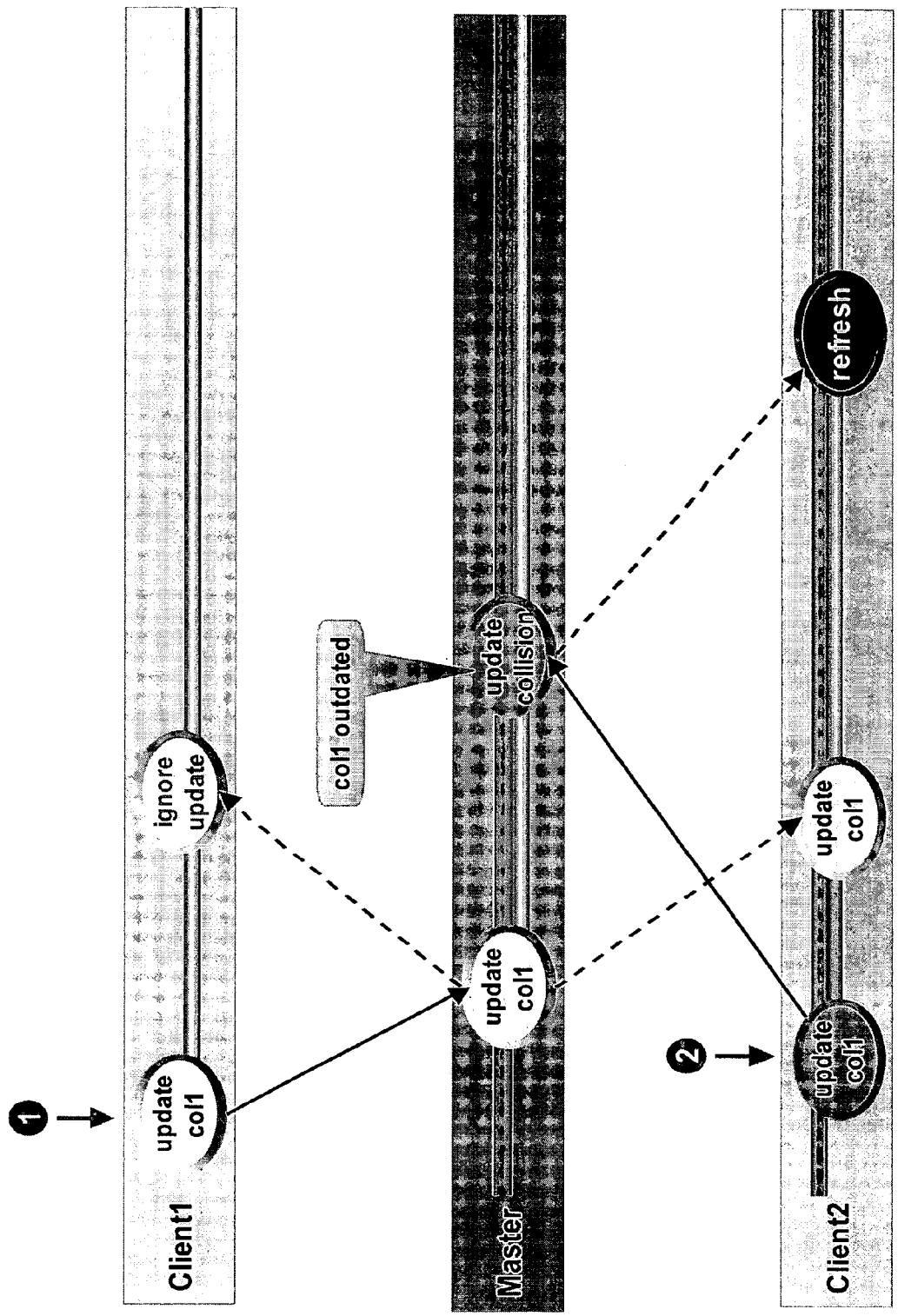

METHOD AND APPARATUS FOR COLLISION RESOLUTION IN AN ASYNCHRONOUS DATABASE SYSTEM

FIELD

Embodiments of the present invention relate to computing systems. More specifically, some embodiments relate to systems and methods for collision resolution in an asynchronous database system in which data may be manipulated concurrently at one or more participating databases.

BACKGROUND

Increasingly, database systems are deployed having a master database and a number of client databases, where the client databases each have data from the master database. When the client databases are allowed to modify, add or delete data, it can be difficult to manage conflicts or collisions. For example, two different clients may attempt to change the same item of data at the same time, resulting in a conflict situation.

One approach to resolve such collisions is to use time stamps or other timing information to identify the first request so that the earliest change request will be performed and any later, colliding requests will be ignored. Unfortunately, this approach does not allow portions of rows to be changed by separate (otherwise colliding) requests, and can further result in the need to transmit an undesirable number of messages between the master database and participating client databases.

Another approach to resolving database collisions is to change the database schema, so that each client database has a unique identifier associated with each row or record. In this manner, collisions are avoided in their entirety (as each row or record identifier is unique). Unfortunately, this approach requires changes in the database schema and the creation of extra data, impairing database performance and efficiency.

Accordingly, improved techniques for collision resolution in an asynchronous database system are needed.

SUMMARY

Pursuant to some embodiments, a system, method, apparatus, means and computer program code for resolving conflicts in a database system are provided where the system includes a plurality of client databases and a master database, each client database having a subset of data from the master database. Pursuant to some embodiments, conflicts are resolved by receiving a data change request message from a requesting client database, the data change request message including change information identifying a proposed change, row identification information, and a before image, and comparing the row identification information and the before image to corresponding information in the master database to identify a potential conflict.

Pursuant to some embodiments, if no conflict is identified processing includes modifying the master database pursuant to the change request, and distributing the changed portion of the master database to each client database other than the requesting client database.

Pursuant to some embodiments, if a conflict is identified, processing includes transmitting a refresh message to the requesting client database, the refresh message including a reference data row from the master database. The master database ignores further messages from the requesting client database associated with the reference data row until an acknowledgement message is received from the requesting client database.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIGS. 7A-J are diagrams illustrating various collision detection and resolution examples pursuant to some embodiments.

DETAILED DESCRIPTION

Figure 1:
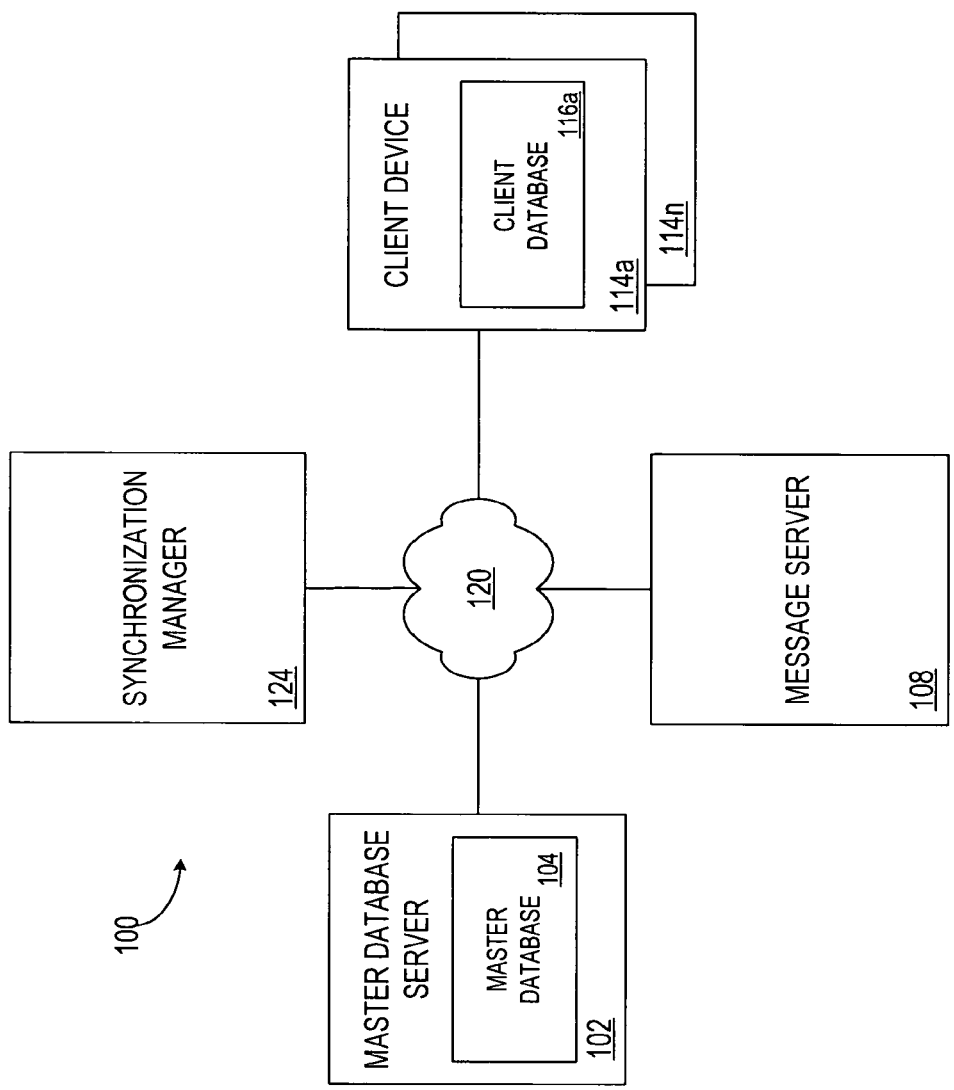
FIG. 1 is a diagram of a system utilizing features of some embodiments.

To alleviate problems inherent in the prior art, embodiments of the present invention introduce systems, methods, computer program code and means for detecting and resolving collision conflicts in a database system. Pursuant to some embodiments, features may be used to detect and resolve conflicts in an asynchronous database system allowing concurrent data manipulation at a plurality of participating databases. Embodiments achieve this without requiring changes in database schema.

For convenience, clarity and ease of exposition, a number of terms are used herein. For example, the term "server" is used to refer to software configured to perform tasks in response to requests from a "client". One or more servers may be implemented on the same or different computing devices. As an example, referring to components discussed below in conjunction with FIG. 1, both a "master database server" and a "message server" may be implemented on the same computing device or may be implemented on different computing device. As another example, the terms "rows" and "columns" are used in the manner understood by those skilled in the art. In general, the term "row" refers to a record of data, and the term "column" refers to fields of data encompassing one or more rows.

As used herein, systems, components or devices "in communication" with one another are directly or indirectly capable of communicating over any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Features of embodiments of the present invention may be used in any of a number of different types of database systems, including, for example, structured query language ("SQL") database systems. For example, applicants have discovered that features of embodiments provide desirable results when used in conjunction with a database system having a plurality of client databases synchronized with a master database where data may be concurrently manipulated at each of the databases.

Embodiments of the present invention will now be described by reference to the drawings. In general, an overview of a database system in which features of the present invention may be used will first be presented, followed by a description of synchronization techniques, and a description of synchronization of client databases. Several process diagrams describing processes for detecting and resolving collisions will then be presented followed by a number of illustrative examples of collision situations and the detection and resolution thereof by the present invention.

System Introduction

To illustrate features of some embodiments of the present invention, reference is first made to FIG. 1 where an illustrative database system 100 is shown. Database system 100 may be, for example, a SQL database system such as the MaxDB® database system offered by SAP AG, Inc. of Walldorf Germany. Database system 100 includes a master database server 102, a plurality of client devices 114*a-n*, a message server 108, and a synchronization manager 124, all in communication via one or more networks 120 or other communication paths.

Each of the devices of FIG. 1 may be computing devices known in the art, such as, for example, one or more personal computers, servers, workstations, or the like. Each device may include one or more microprocessors used to execute processor-executable process steps so as to perform the session access processes described herein. Each device may include one or more communication ports used to transmit and to receive data from other devices, including I/O devices, other devices of system 100, or the like. Some devices, such as one or more client devices 114 may be a portable computing device, such as a personal digital assistant, telephone, laptop, or the like.

Master database server 102 stores or has access to a master database 104. Master database 104 stores data in any of a number of formats and manners known in the art. In some embodiments, master database 104 is a relational database storing data in a plurality of tables each having one or more data records and data fields. Pursuant to some embodiments, each data row in the database is identified by a primary key and an identifier created when the row is created or inserted into the database. As used herein, the term "row version" is used to refer to a specific instance of a data row together with its identifier.

Each participating client 114 in database system 100 is associated with a client database 116. Pursuant to some embodiments, each client database 116 is synchronized with master database 104 to store a subset of data from the master database 104. As an illustrative example in which embodiments of the present invention are used in an airline reservation system, if the master database stores airline reservation information for a plurality of different customers, a client database in the system may be synchronized to include a subset of the reservation information (e.g., such as information related to confirmed or booked reservations or information related to specific customers). Embodiments allow a database system to include a master database and a number of different client databases, in which all of the databases can concurrently access, update and modify data in the database system. In particular, embodiments allow such concurrent usage and manipulation by efficiently detecting and resolving collisions.

Database system 100 includes a message server 108 configured to transmit data updates and messages between client devices 114 and master database server 102. Although shown as a separate component from master database server 102, those skilled in the art will recognize that message server 108 and database server 102 may be implemented on the same or related device. Pursuant to some embodiments, message server 108 is implemented in accordance with the Java® Message Service (JMS) specifications promulgated by Sun Microsystems®, although those skilled in the art will appreciate that other message services or tools may also be used.

Pursuant to some embodiments, message server 108 includes code configured to transmit unidirectional or bidirectional messages point-to-point (e.g., such as a message from master database server 102 directed to a specific client database 116*a*) as well as code configured to broadcast messages (e.g., such as a message from master database server 102 to all client databases 116). In general, database system 100 uses message server 108 to transport data change requests from a requesting database to master database 104 in an orderly and asynchronous fashion. Conflict rules and routines, as discussed further below, are applied based on the content of messages transmitted via message server 108. Database system 100 further uses message server 108 to transport messages (such as updates or refresh messages) from master database 104 to one or more client databases 116.

Database system 100, as depicted, also includes a synchronization manager 124. Again, although shown as a separate component from master database server 102, those skilled in the art will appreciate that synchronization manager 124 and database server 102 may be implemented on the same or related devices. Pursuant to some embodiments, synchronization manager 124 is code configured to allow a user (e.g., such as a database administrator or other operator) to interact with database system 100 to set up and manage the synchronization between master database 104 and one or more client databases 116.

For example, an authorized user may interact with master database 104 through synchronization manager 124 to select one or more preexisting tables of the master database 104 for synchronization. The tables are prepared by the synchronization manager 124 which gathers and stores meta information about column names and types, and creates and prepares shadow tables at both the master and the client databases, thereby allowing the client databases to be synchronized with the master database. In some embodiments, this may include identifying the subsets of data in the master database which are to be replicated in a client database. Once the synchronization schema has been defined, database system 100 is operated to transmit the synchronization data from the master database 104 through the message server 108 to the destination client databases 116.

After client databases have been created and synchronized with master database 104, database system 100 may be operated to allow concurrent data manipulation at each client database as will be described further below.

Synchronization

Figure 2:
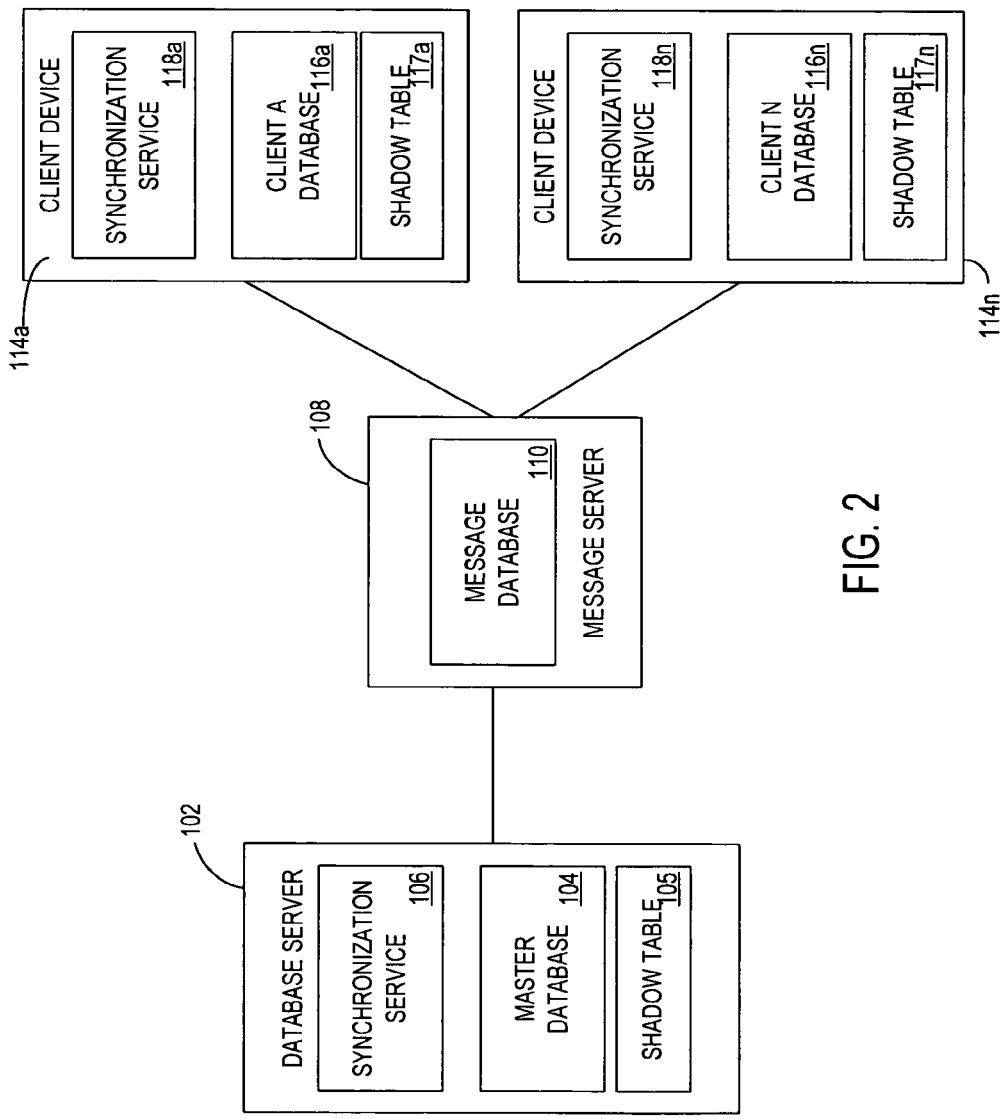
FIG. 2 is a further diagram of the system of FIG. 1 pursuant to some embodiments.

Reference is now made to FIG. 2, where further details of some aspects of database system 100 are shown. In particular, as shown in FIG. 2, master database server 102 is associated with both master database 104 and a synchronization service 106. Similarly, each participating client database 116 is associated with a synchronization service 118. Each synchronization service may be a program or routine coded to receive (and act upon) messages received from message server 108 and to create and transmit messages to message server 108. For example, the messages may be data change request messages sent between the databases as described herein.

In addition, as shown in FIG. 2, each database (including master database 104 and each client database 116) is associated with a shadow table 105, 117. Each shadow table 105, 117 stores historical data for its associated database. For example, as used herein, each shadow table 105, 117 stores sufficient information to create a "before image" associated with data of a database. For example, if a database such as client database 116*a* updates information in the database 116*a*, the state of the database prior to execution of the update command will be stored in the associated shadow table 117*a*. This information is used, as will be described further below, to identify and manage collisions in a database system.

Each synchronization service 106, 118 is defined by synchronization schema created to identify the data to be shared asynchronously between the master database and participating client databases. For example, a database administrator may define synchronization schema for a database system by interacting with database server 102 via synchronization manager 124 (shown in FIG. 1). The administrator may group the database tables of master database 104 into logical synchronization groups and then define master-client relationships between units of different databases. The complete definition of a system's synchronization units and relations may be stored at, or accessible to, the master database 104. Information identifying these units and relations may also be stored at a message database 110 of message server 108 so that messages between databases may be appropriately routed. In some embodiments, relationships may be defined as either "topics" (where messages associated with the "topic" are broadcast to all designated recipients of the topic) or "queues" (where messages are set through a queue in point-to-point fashion).

When a synchronization schema is created, each of the participating client databases will receive the contents of those tables (or portions of tables) defined by the schema. The tables are transmitted to the client databases through message server 108. As will be described in further detail below, when participating databases attempt to modify (e.g., such as by deleting, inserting or updating information) portions of the tables, embodiments of the present invention operate to identify and resolve collisions. In this manner, a plurality of databases can share access to data and are able to concurrently manipulate the data. Each participating database is ensured that it holds the same data after collision detection and resolution processes are performed. In general, embodiments use the master database as the reference to override conflicts.

Master and Client Databases

Figure 3:
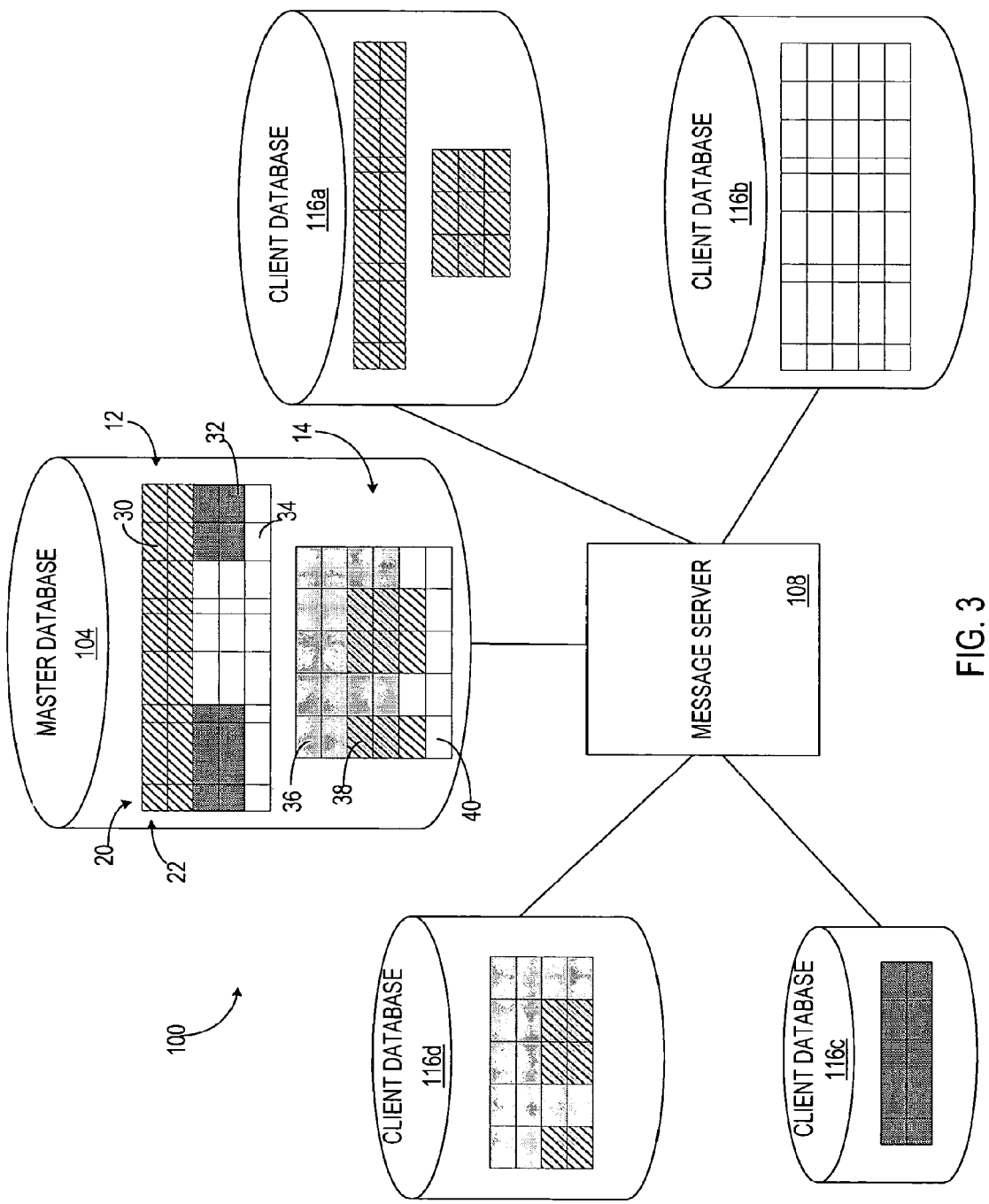
FIG. 3 is a diagram illustrating synchronized databases in a database system such as the system of FIG. 1 pursuant to some embodiments.

Reference is now made to FIG. 3, where components of an example database system 100 pursuant to some embodiments is shown. As depicted, database system 100 includes a master database 104 having several tables (including tables 12 and 14) of data. Each table has a number of rows (including row 22) and columns (including column 20). Each row is identified by a row identifier and row version information (not shown).

Database system 100 also includes a number of client databases 116*a*-116*d* (e.g., hosted at remote client devices, not shown). Pursuant to some embodiments, each participating client database 116 in database system 100 may be configured such that it includes data from master database 104. Pursuant to some embodiments, a number of client devices can have the same data and can concurrently manipulate and modify the data. In the example depicted in FIG. 3, each client database 116 has different arrangements of data from master database 104. For example, client database 116*a* has two rows of data from table 12, and portions of two rows of data from table 14. Client database 116*b* includes all of the data from table 12, but none of the data from table 14, etc.

As discussed above, each of the client databases is configured using a synchronization manager (not shown). Once the synchronization schema for each client database 116 is defined, master database 104 transmits data to each client database 116 via message server 108. Further, after the synchronization schema are defined and data propagated to each client database, any modifications to a data item are automatically propagated to the appropriate client database. As an example, if data in table 12, in the area shown as item 32, are updated, message server 108 will automatically broadcast updates to the data to client database 116*b* and 116*c* (because the synchronization schema for those databases indicates that they share data from table 12, area 32).

The result is an ability to define and support a number of subsets of the master database, or "mini databases", each of which is capable of supporting concurrent data manipulation. Because collisions are detected and resolved at the master database, each client database is assured of maintaining current and accurate data. For example, client databases 116*a* and 116*b* share data from table 12. As a result of the conflict resolution and detection features of the present invention (as well as other aspects of embodiments disclosed herein), both databases can edit data and be assured that any collisions between their edits will be managed by master database 104 so that both databases enjoy current and accurate data.

Those skilled in the art will recognize that a large number of different combinations and types of client databases may be deployed using features of the present invention.

Collision Detection and Resolution Method Overview

Figure 4:
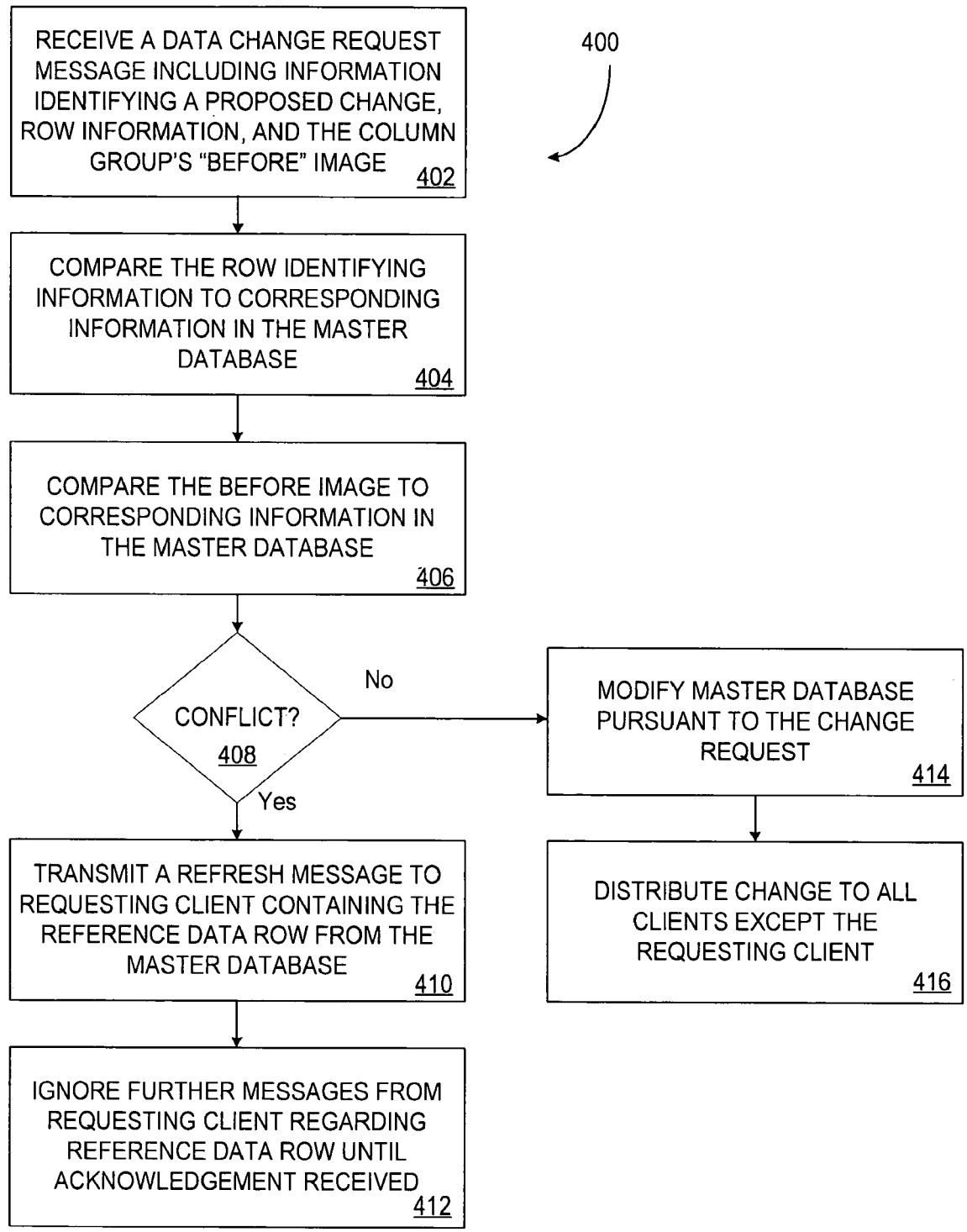
FIG. 4 is a flow diagram illustrating operation of some embodiments.

Referring now to FIG. 4, a flow diagram is shown depicting a process 400 for collision detection and resolution pursuant to some embodiments. The process depicted in FIG. 4 (and other processes described herein) does not imply a fixed order to the process steps, and embodiments of the present invention may be performed in any order that is practicable. Process 400 may be performed under control of a database system such as database system 100 shown in FIGS. 1 and 2.

Process 400 begins at 402 with the receipt of a data change request message including information identifying a proposed change (e.g., such as a data management language command including update, insert, or delete as well as the data associated with the command), row information associated with the change (e.g., including a row identifier and row version information), and the relevant column group's "before" image (e.g., taken from the shadow database associated with the requester). For example, this data change request message may be generated by a client database 116 as a result of an attempt to insert, delete, or update information in the client database 116. The message may be transmitted from the client to master database 104 via message server 108.

Processing continues at 404 where the row identifying information received is compared to corresponding information stored in the master database. For example, the received row identifier and/or row version information is compared to data stored in the master database. If the received information does not match the stored information, a collision has occurred (e.g., the row may have previously been deleted or updated by another client, and the data change request received at 402 cannot be completed), and processing may continue to 410 as discussed below.

Processing may also continue at 406 where the column group's "before" image is compared to corresponding information at the master database. For example, the received information includes the row as changed by the requesting client and an image of the row as it existed before the row was changed by the requesting client (the "before" image of the row). This before image is matched against the current row in the master database to determine if the data has changed at the master database prior to receipt of the data change request from the requesting client. If the received image does not match the image stored at the master database, a collision has occurred and processing continues to 410.

Processing at 410 includes transmitting a refresh message to the requesting client. The refresh message is transmitted as a point-to-point message via the message server 108 and contains the reference data row from the master database. Processing continues at 412 where the master database is configured to ignore any further messages from the requesting client regarding the affected row until the requesting client has acknowledged receipt of the refresh message. In this manner, the requesting client is given the opportunity to resubmit a data change request based on the current state of the master database.

If processing at both 404 and 406 indicate that the received information matches information stored at the master database, processing at 408 indicates that no conflict has occurred and processing may continue at 414 where the master database may execute the data management language command received in the data change request message (e.g., by updating data, inserting or deleting a row, etc.). Once the data has been modified, the modification is broadcast to all of the affected clients (other than the requesting client). In this manner, all participating clients are able to maintain the same data and the master database is able to detect and resolve collisions.

Collision Detection and Resolution Detail (at Master)

Figure 5:
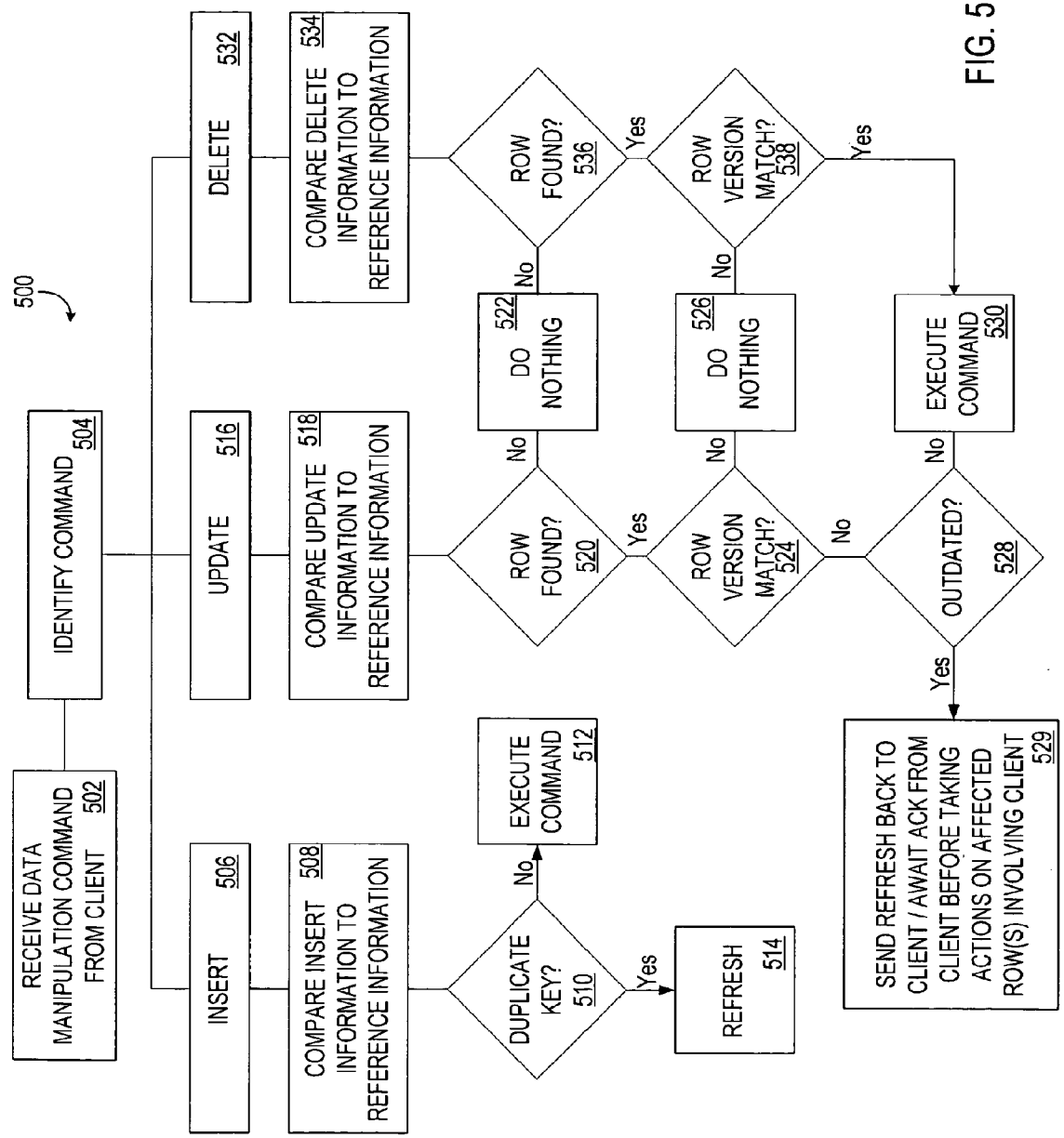
FIG. 5 is a further flow diagram illustrating operation of some embodiments.

Reference is now made to FIG. 5, where a further flow diagram is shown which depicts a process 500 performed at master database 104 when a data manipulation command is received from a client database. As discussed above, pursuant to some embodiments which are implemented in a SQL system, several data manipulation commands may be used to modify data in a database, including an insert, delete or update command. Pursuant to some embodiments, when a client database attempts to manipulate data, the request message is sent (e.g., as a point-to-point message through the message server) to the master database 104 for processing. Pursuant to some embodiments, master database 104 performs processing as shown in FIG. 5 to identify and resolve collisions based on the information received from the client and based on reference information available to the master database 104.

Process 500 begins at 502 when a data manipulation command is received at the master database. At 504, processing includes identifying the specific command. In some embodiments, the command is identified as either an insert, an update, or a delete command and processing continues along one of three paths 506, 516, or 532 respectively. If the client database is attempting an insert, processing continues at 508 where the master database compares the insert information received from the client database to some reference information at the master database. In particular, the insert information is compared to determine if the row associated with the insert is a duplicate (e.g., is it an attempt to insert a row which already exists?) by comparing the the "key" or "row" information with information stored in the master database to determine if the key is a duplicate. If so, the master database produces an error message stating that the key is a "duplicate key". If the comparison indicates there is a duplicate key, a collision is detected and processing continues at 514 where the master database causes a refresh message to be sent back to the requesting client.

If the comparison at 510 indicates that the key is not a duplicate, the master database continues by executing the data manipulation command by inserting the row as requested by the requesting client. The insert information is then broadcast to all affected client databases (other than the requesting client).

If the data manipulation command received at 502 is an update command, processing continues at 518 where the received information is compared to reference information at the master database. In this case, several comparisons are performed, including a comparison at 520 to determine if the row can be found, a comparison at 524 to determine if the row version matches, and a comparison at 528 to determine if there is a mismatch. If the row is not found, processing continues at 522 where the master does not perform the command and does not update as requested by the client (as a delete from the master has not yet been applied at the client). If the row is found, but there is a row version mismatch, the master again does nothing (because a refresh has been sent from the master due to a prior insert collision). Processing at 528 includes a comparison between the "before" image of the column group with the before image data received in the request message from the client. If the before image does not match the before image received from the requesting client, processing continues at 529 and a refresh message is sent to the requesting client. The master awaits an acknowledgement from the requesting client before taking any further action(s) on the affected row(s) involving the requesting client.

Only if each of the comparisons are satisfied does processing continue at 530 and the update command is executed as requested by the requesting client. The update is broadcast using the message server to all affected client databases (other than the requesting client database).

If processing at 504 indicates that the received command is a delete command, processing continues to 534 where the delete information received from the requesting client at 502 is compared to reference information in the master database. If the row affected by the delete is not found (at 536), processing continues at 522 where the master does nothing (as the deletion already took place). If the row is found, but there is a row version mismatch, processing continues at 526 where the master again takes no action because a new version of the row has already been inserted. If the row is found and the version matches, processing continues at 530 where the delete is executed and information is propagated to all affected clients (other than the requesting client) via a broadcast message sent through the message server.

In this manner, embodiments provide a small set of conflict situations that are easily and quickly identified. Those skilled in the art will recognize that additional, fewer, or different command types may be used so long as appropriate conflict rules are defined. Pursuant to some embodiments, actions taken by the master database in process 500 are taken based on a state analysis of the database and resulting in the performance of a predetermined sequence of action (as shown above) to be taken. For example, when the command received is an insert command, and the key is not a duplicate key (as determined by processing at 510), then the state of the comparison is "OK", and a rule automatically causes the master database to insert and set the received row version.

Collision Detection and Resolution Detail (at Client)

Figure 6:
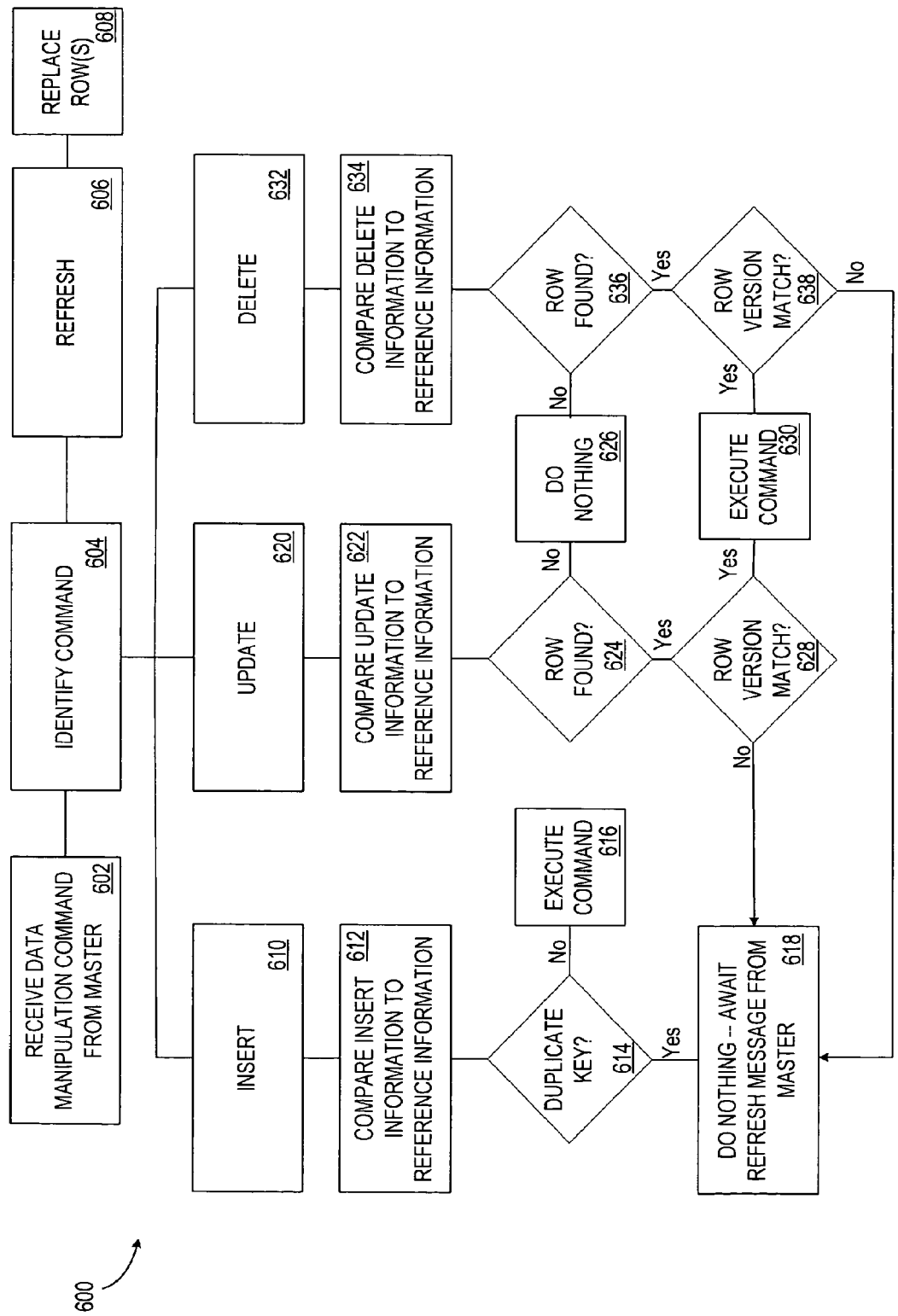
FIG. 6 is a further flow diagram illustrating operation of some embodiments.

Referring now to FIG. 6, processing at client databases in a database system will now be described. Processing begins at 602 where a data manipulation command is received from the master database (e.g., as a broadcast message from master after completion of processing of the process 500 discussed above). The client database identifies the command (which may be, in some embodiments, an insert, update, delete or refresh command, although those skilled in the art will recognize that other or different commands may also be used). If the command is a refresh command, the row information received from the master is used to replace rows in the client database.

If the command is an insert command, processing continues at 612 where the received insert information is compared to reference information to determine if a duplicate key exists. If the key is not a duplicate, then the command is executed and the insert is performed and the received row version is set. If the key is a duplicate, processing continues at 618 and the client does nothing and awaits a refresh from the master due to a collision to happen at the master.

If the command is an update command, processing continues at 622 where the received update information is compared to reference information to determine if the row can be found and if there is a row version match. If the row cannot be found, the client does nothing because a delete from the client has not yet been applied at the master database. If the row is found, but there is no row version match, the client does nothing because a refresh will be received from the master due to a collision to happen at the master database. If the row is found and there is no mismatch, processing continues at 630 and the update is executed.

If the command is a delete command, processing continues at 634 where the received delete information is compared to reference information to determine if the row to be deleted can be found and to determine if there is a row version mismatch. If the row cannot be found, the client does nothing because a delete from the client has not yet been applied at the master database. If there is a row version mismatch, the client does nothing because a refresh will be received from the master database due to a collision to happen at the master database. If the row is found and there is no version mismatch, processing continues at 630 and the delete is executed.

This process, and the process of FIG. 5, is continually repeated as data is modified at each participating client database. Again, those skilled in the art will appreciate that additional or different collision rules, procedures, and command messages may be used.

Collision Detection and Resolution Examples

Referring now to FIGS. 7A-7J a number of examples of conflicts that may be detected and resolved using embodiments of the present invention will now be provided. Each of the examples illustrates operation of a database system including a master database 104 and two client databases (database a 116a and database b 116b). A variety of situations will be described in which different types of conflicts are both detected and resolved. Other components described above (including message server 108, etc.) are used to detect and resolve conflicts but are not shown or necessarily described in the examples of FIG. 7. In the examples of FIG. 7A-7J, the horizontal axis generally shows actions taken over time but is not intended to accurately depict a particular timing. For example, in FIG. 7A, the "update col 1" message at the client database 116a occurs before the "update col 1" message is received at the master database 104 (but the spacing between the messages is not intended to convey the actual time lapse between actions).

Referring to FIG. 7A, an example of an update collision is shown. In particular, the figure depicts a situation where processing at step "1" includes operation of one database (a database at "client 1") to update information in a particular column of a table. Pursuant to embodiments of the invention, a data change request message is transmitted from the client database to the master database (e.g., via message server 108). The master database causes column 1 of the table to be updated pursuant to the message. The master database transmits (or, in some embodiments, broadcasts a message via a message server) messages to participating client databases that are synchronized with the information in column 1 (including a message sent to the database at "client 2"). In some embodiments, a message may also be sent to client 1, but the client will ignore the update (as it initiated the update). In some embodiments, no message will be broadcast to the requesting client. In this manner, all participating databases are updated with the correct information at column 1.

In the example, after the client 1 database performs the first update at "1", the database at client 2 attempts to update information associated with the same column (at "2"). Client database 2 transmits a data change request message to the master database. Upon receipt of the message, the master database identifies an update collision, and causes a refresh message to be sent to the requesting client database (client database 2). The requesting client database may then determine whether it wishes to again attempt to update column 1.

Figure 7B:
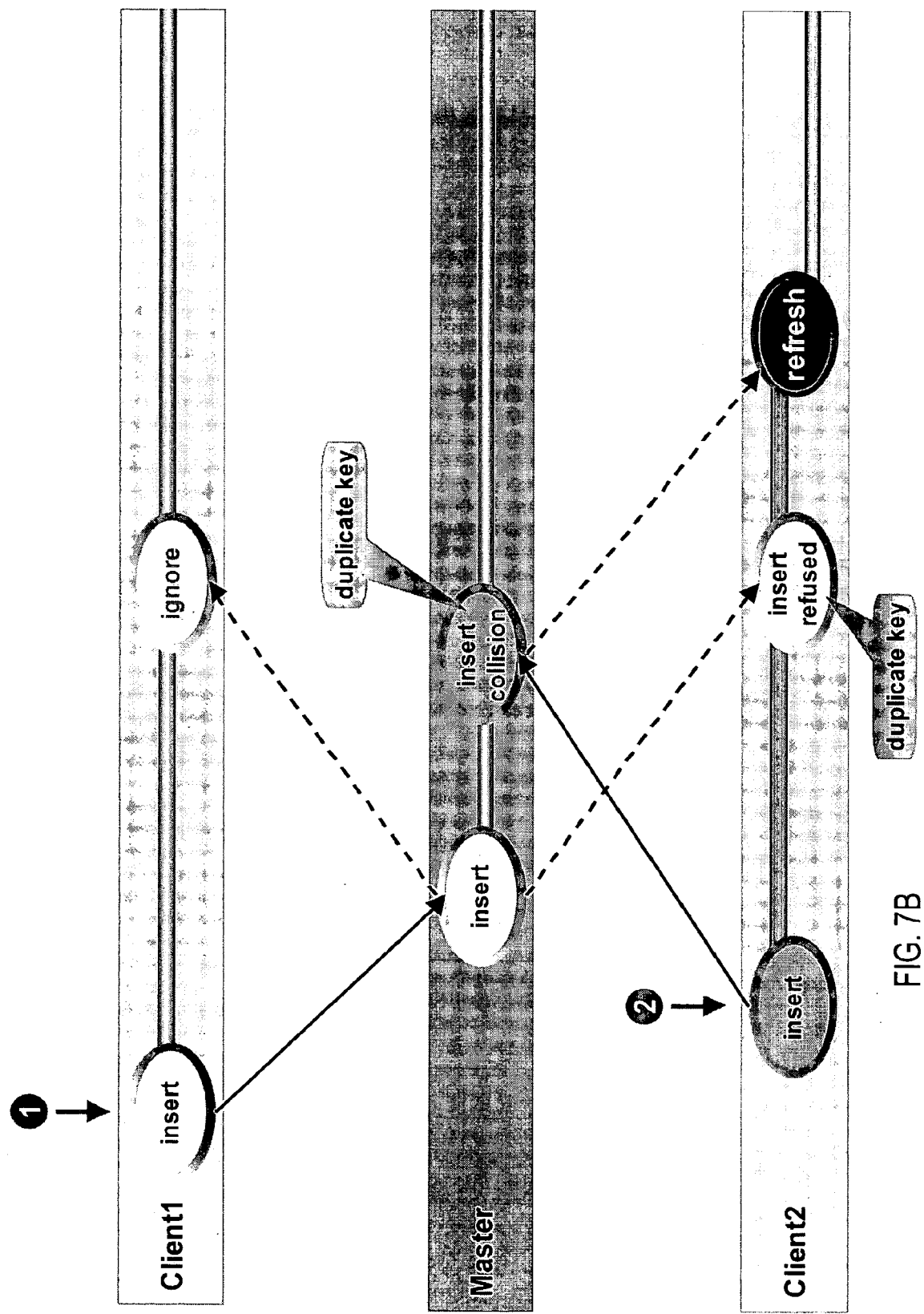

Referring now to FIG. 7B, an example of a duplicate insert collision is shown. As shown, client database at client 1 attempts (at "1") to insert a new row into the database and transmits a data change request message to the master database. The master database performs the insert and broadcasts an insert message to participating client databases (including the database at client 2). If the message is also broadcast to the requesting client (client 1), the requesting client ignores the update. In this example, the client 2 database had also attempted to perform an insert (at "2") resulting in an insert collision. The insert collision is detected by client 2 database as it identifies that a duplicate key (associated with a new row in the database) exists. A refresh message is transmitted from the master database to the client 2 database so that the row from the client 1 database can be inserted. If desired, a modification to the row could be made.

Figure 7C:
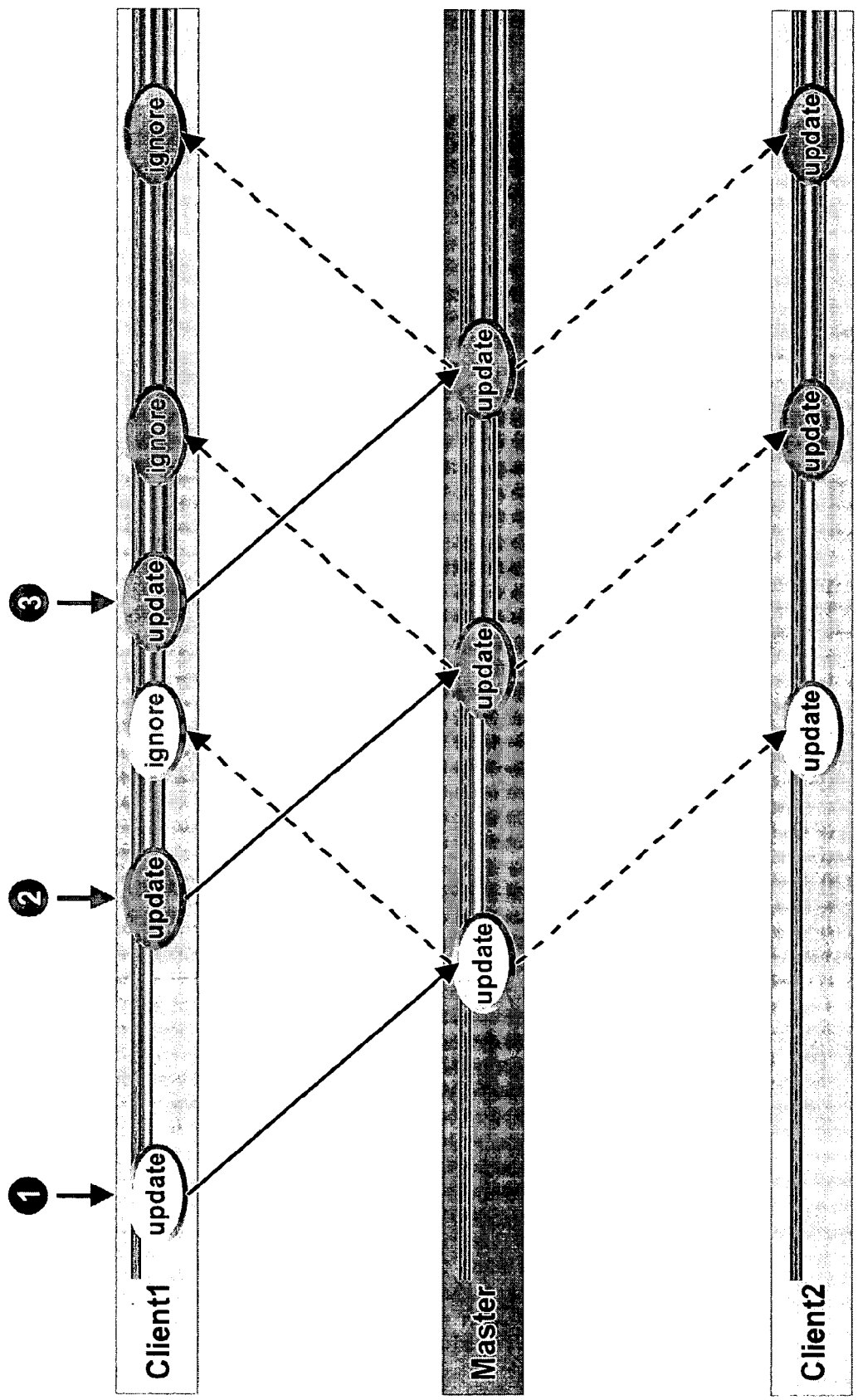

Referring now to FIG. 7C, an example of multiple updates from one client database is shown. As depicted, client 1 database creates a number of sequential updates ("1", "2", and "3") to a synchronized database. Each update causes a data change request message to be transmitted to the master database which then performs the update command. Upon performing the update, update messages are broadcast to participating client databases (including client 2database). In some embodiments, the update is also broadcast to the requesting database (here, client 1), but the requesting database ignores the update.

Figure 7D:
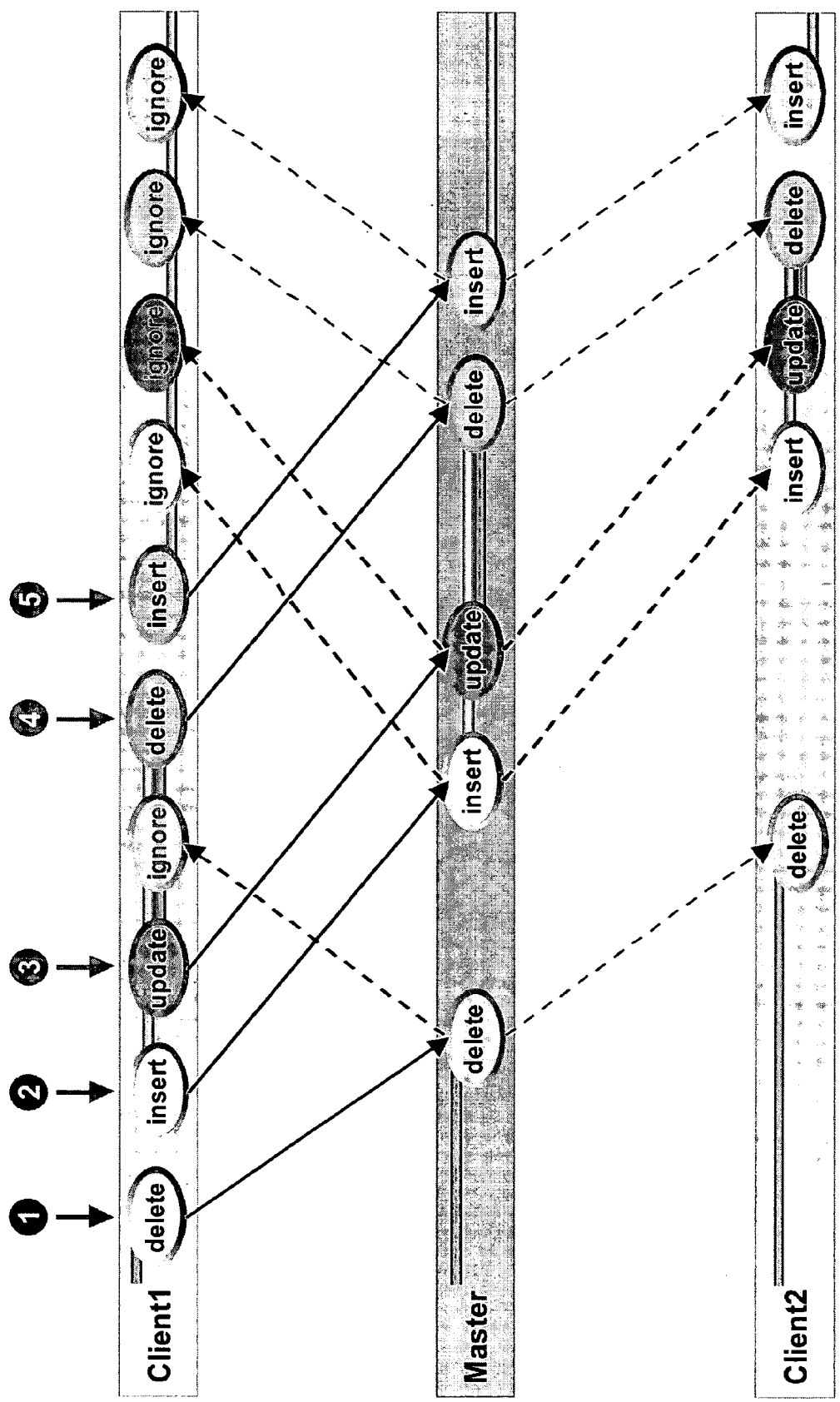

Referring now to FIG. 7D, an example of various deletions and insertions are provided illustrating the situation where one client database (client 1) presents a series of data manipulation commands affecting a row.

Figure 7E:
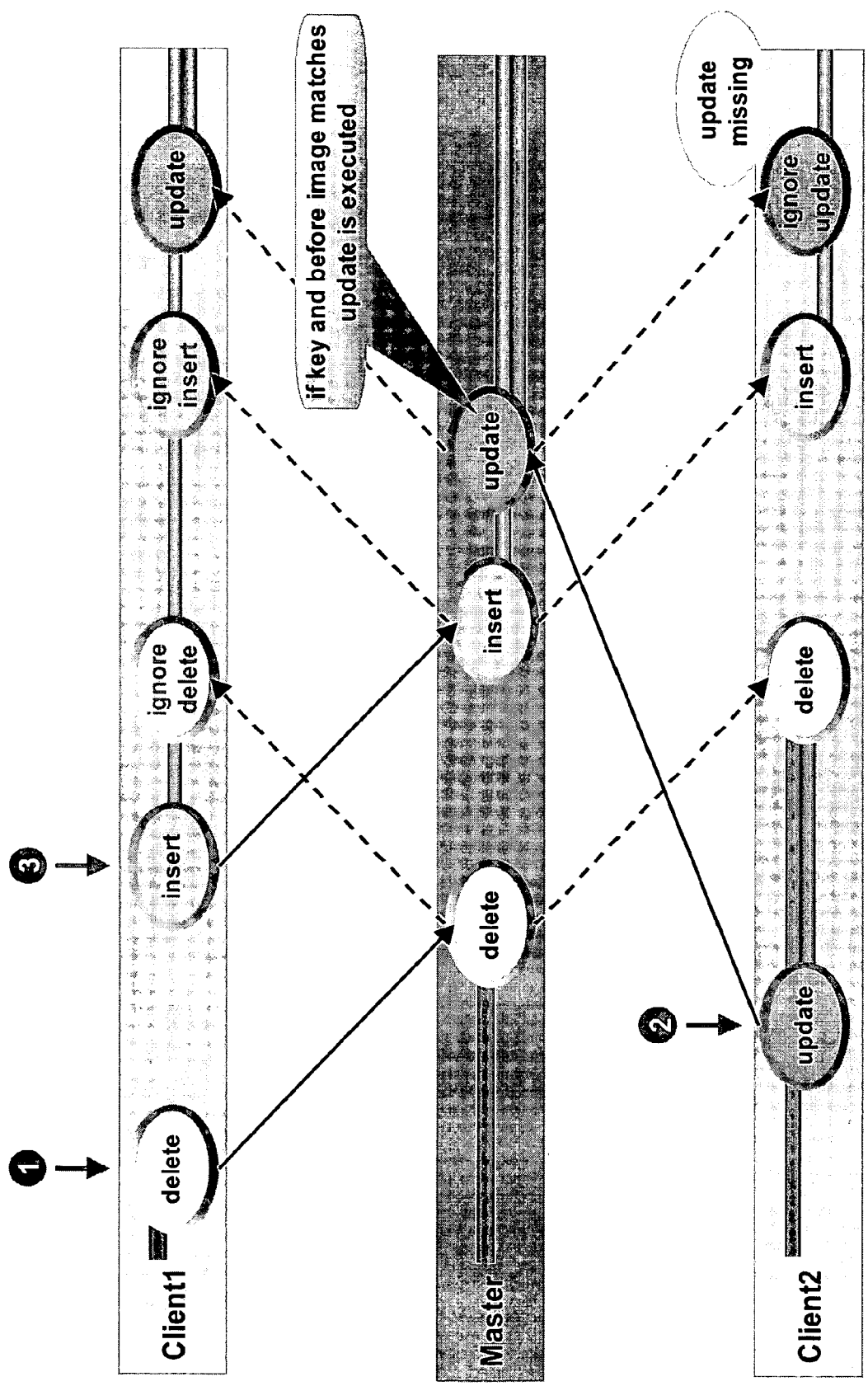

Referring now to FIG. 7E, an example is depicted to illustrate the use of row versions. In the illustrative example, the client 1 database deletes a row, and shortly thereafter attempts to insert a new row. However, prior to the insert, a second client database (client 2) has updated the row deleted by the client 1 database.

Figure 7F:
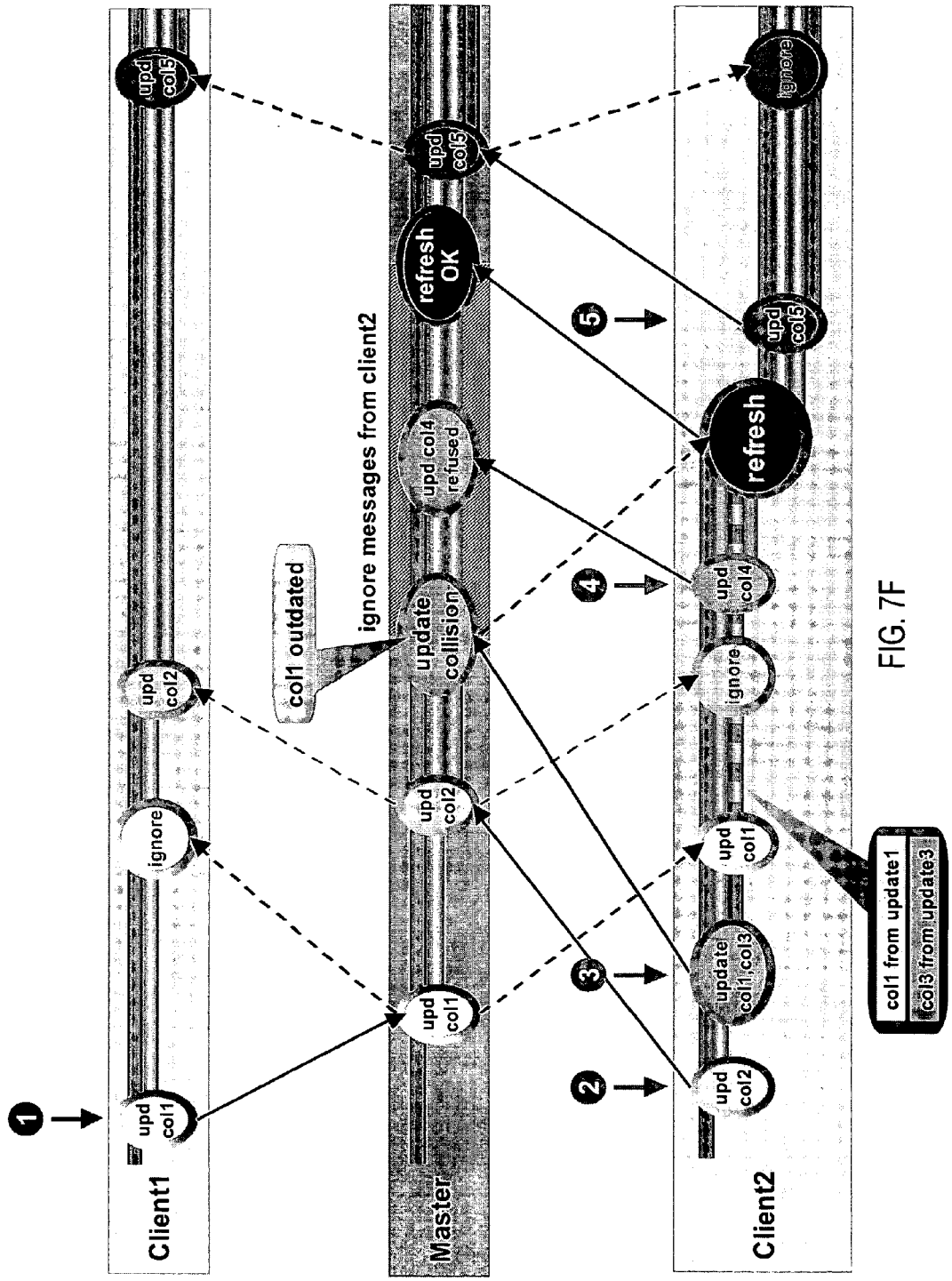

Referring now to FIG. 7F, an update collision example is shown where a first client database (client 1) updates column 1, but before the update is communicated to a second client database (client 2), the client 2 database attempts to update the old version of column 1. The master database identifies that there is an update collision and ignores messages from the client 2 database until an acknowledgment is received (resulting in a refusal to update column 4).

Figure 7G:
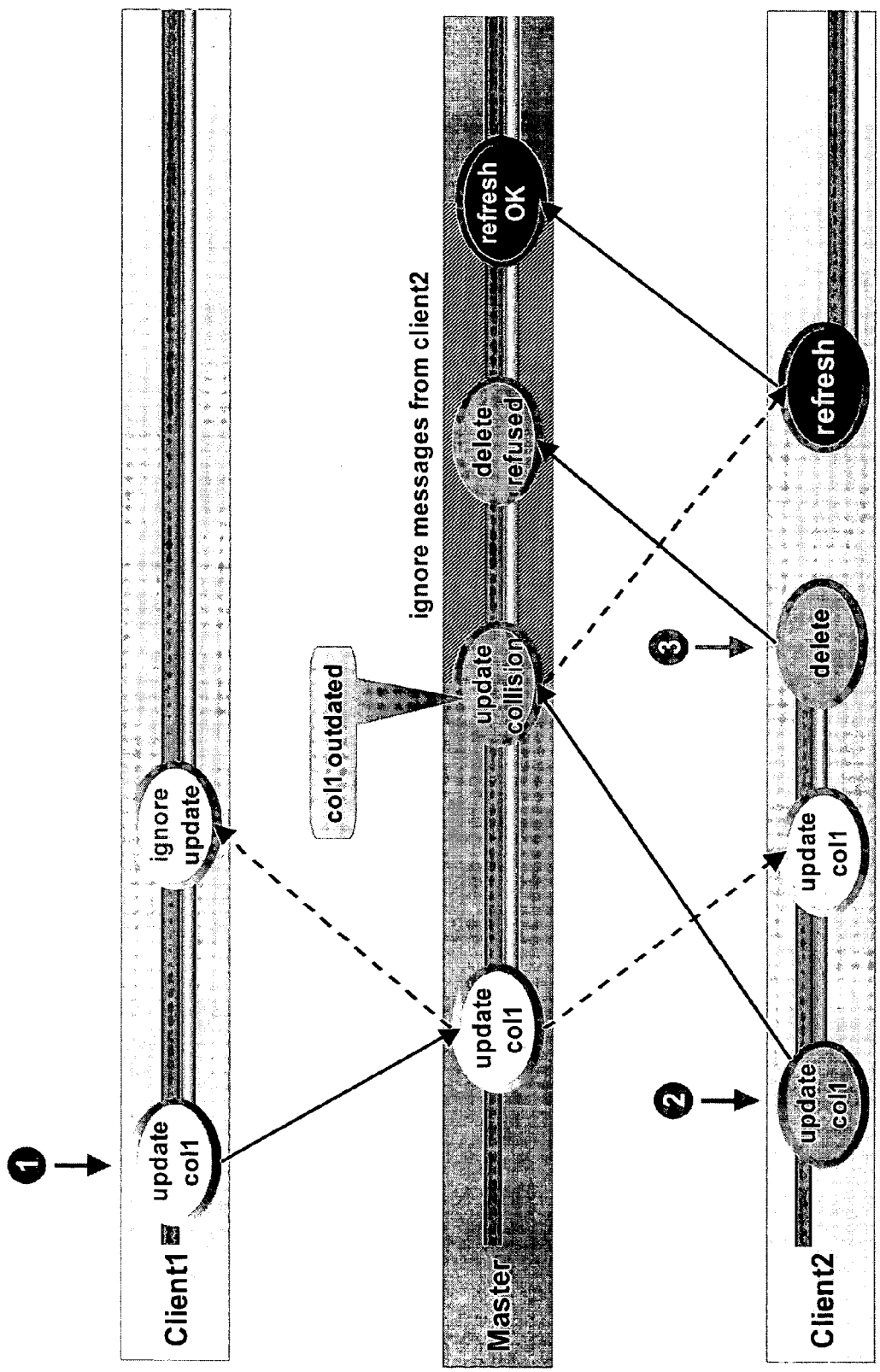

Referring now to FIG. 7G, an update collision and delete example is shown in which the client 1 database updates column 1. Before the update is broadcast to other client databases, the client 2 database attempts to update the old version of column 1. The master database identifies the collision and ignores further messages from the client 2 database until an acknowledgement of a refresh message is received, resulting in a refusal to enter a delete command received from the client 2 database.

Figure 7H:
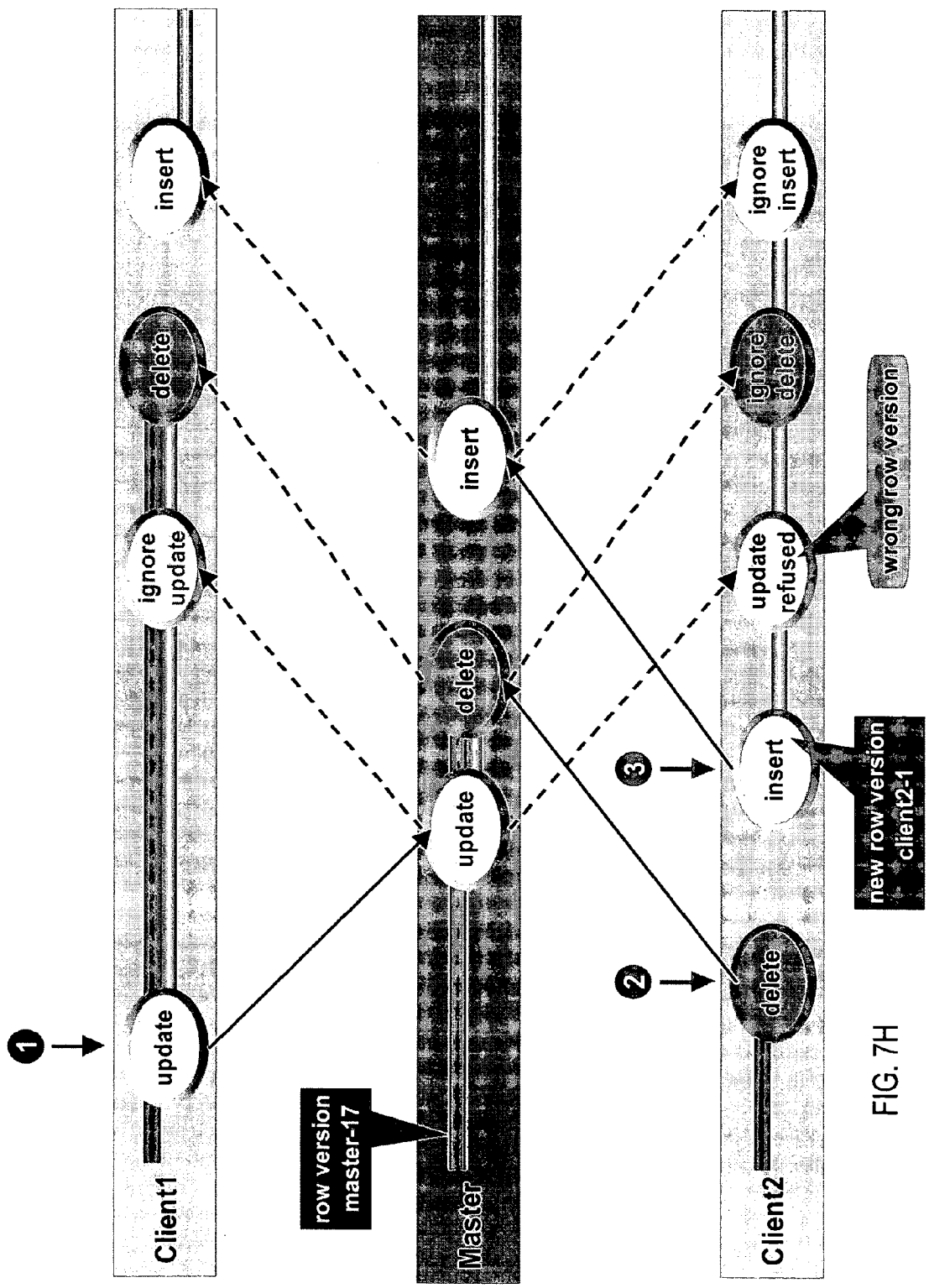
Figure 7I:
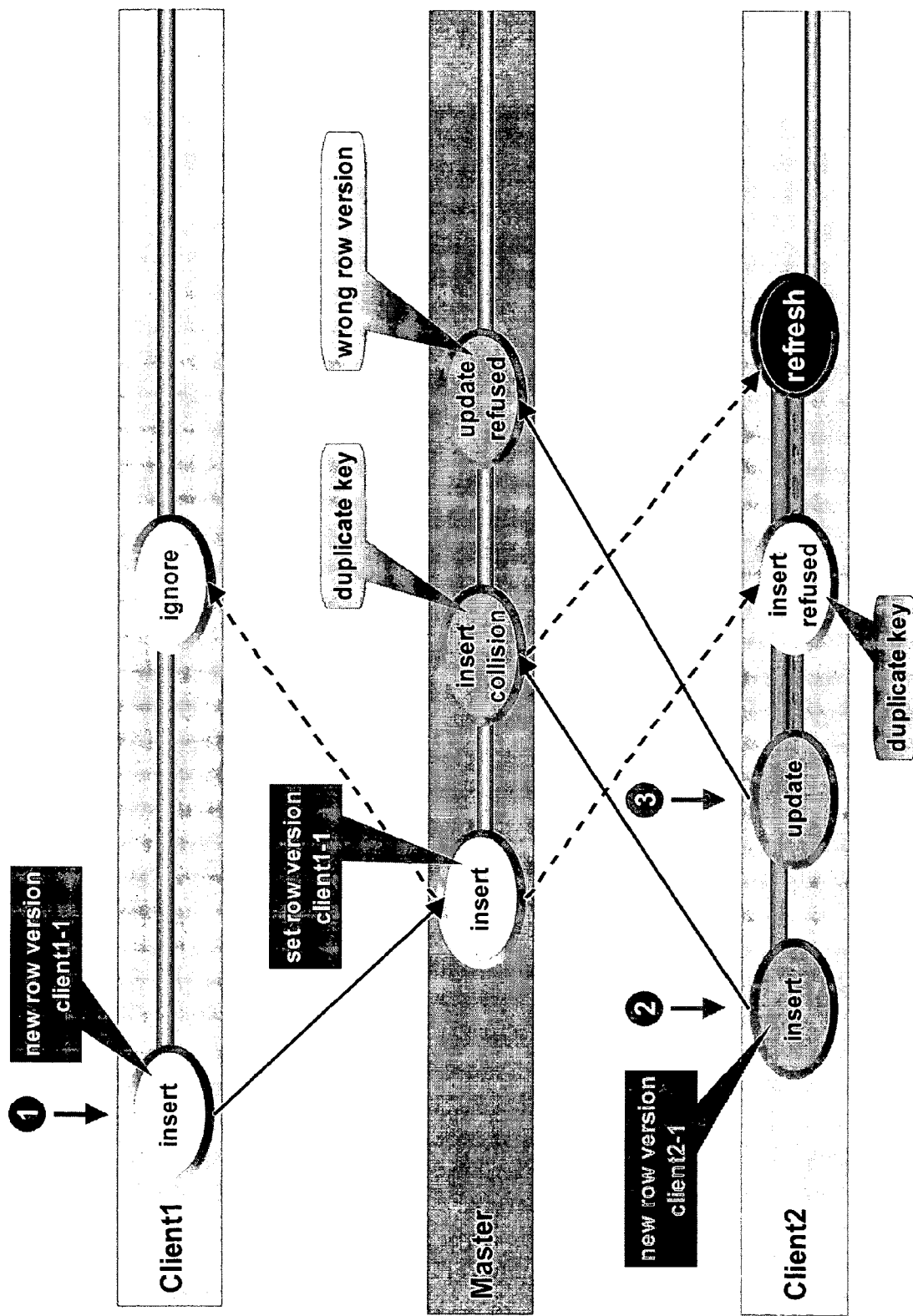
Figure 7J:
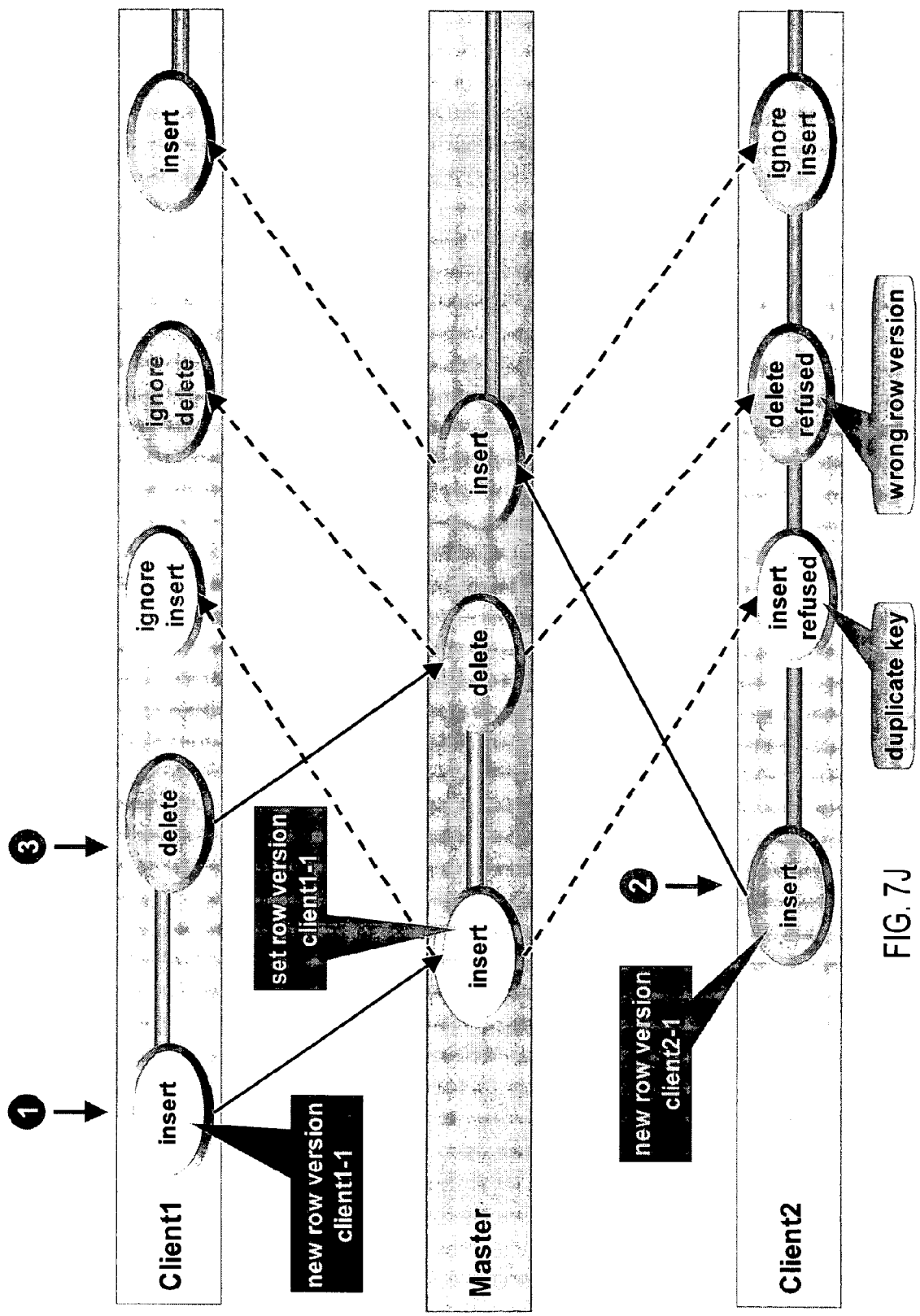

FIG. 7H depicts an update version mismatch at a client database. FIG. 7I illustrates a duplicate insert at the master, and FIG. 7J illustrates a duplicate insert at the client.

Although the present invention has been described above with respect to some embodiments thereof, it should be noted that the above-described embodiments may be altered to create completely or partially different embodiments without departing from the spirit and scope of the appended claims.

What is claimed is:

1. A method performed by a database system including a plurality of client databases and a master database, each client database having a subset of data from the master database, the method comprising:
   receiving, by a processor, a data change request message from a requesting client database, the data change request message including change information identifying a proposed change, row identification information, and a before image; and
   comparing, by the processor, the row identification information and the before image to corresponding information in the master database to identify a conflict;
   wherein the data change request message is an update request and the comparing indicates a conflict, the method further comprising:
   ignoring, by the processor, further messages that are from the requesting client database and associated with a reference data row from the master database until an acknowledgement message is received from the requesting client database;
   wherein the acknowledgement message acknowledges receipt of a refresh message that includes the reference data row from the master database.

2. The method of claim 1, further comprising:
   determining that a conflict exists if the row identification information received in the data change request message does not match corresponding information in the master database.

3. The method of claim 1, further comprising:
   determining that a conflict exists if the before image received in the data change request message does not match corresponding information in the master database.

4. The method of claim 3, wherein the before image received in the data change request message includes data values of all columns in a column group associated with the proposed change.

5. The method of claim 1, wherein the data change request message is received from a client using an asynchronous messaging system.

6. The method of claim 1, the method further comprising:
   transmitting the refresh message to the requesting client database.

7. The method of claim 1, wherein each of the plurality of client databases are associated with a respective synchronization service, each synchronization service configured to transmit and receive data associated with the subset of data stored in the associated client database.

8. A method performed by a client database to respond to a data change command received from a master database in a database system, comprising:
   receiving, by a processor, a data change command message, the message including a command type, information identifying a proposed change, row identification information, and a before image; and
   comparing, by the processor, the row identification information and the before image to corresponding information in the client database to determine if the proposed change can be made;
   wherein the information identifying a proposed change includes a row as changed by the master database; and
   wherein the before image comprises an image of the row before the row was changed in the master database.

9. The method of claim 8, further comprising:
   determining, by the processor, that the proposed change can be made; and
   executing, by the processor, the command type to update the client database.

10. The method of claim 8, further comprising:
    determining, by the processor, that the proposed change cannot be made; and
    awaiting a refresh message from the master database.

11. An apparatus, comprising:
    a memory storing processor-executable process steps and a master database; and
    a processor in communication with the memory and operative in conjunction with the stored process steps to:
      receive a data change request message from a requesting client database, the data change request message including change information identifying a proposed change, row identification information, and a before image; and
      compare the row identification information and the before image to corresponding information in the master database to identify a conflict;
      wherein the data change request message is an update request and the comparing indicates a conflict, the processor further operative in conjunction with the stored process steps to:
      ignore further messages that are from the requesting client database and associated with a reference data row from the master database until an acknowledgement message is received from the requesting client database;
      wherein the acknowledgement message acknowledges receipt of a refresh message that includes the reference data row from the master database.

12. The apparatus of claim 11, further comprising a communication device for communicating with a message server to transmit and receive messages associated with the data change request message.

13. A medium storing processor-executable process steps, the process steps comprising:
    a step to receive, by a processor, a data change request message from a requesting client database, the data change request message including change information identifying a proposed change, row identification information, and a before image; and
    a step to compare, by the processor, the row identification information and the before image to corresponding information in the master database to identify a conflict;

wherein the data change request message is an update request and the comparing indicates a conflict, the process steps further comprising:
a step to ignore, by the processor, further messages that are from the requesting client database and associated with a reference data row from the master database until an acknowledgement message is received from the requesting client database;
wherein the acknowledgement message acknowledges receipt of a refresh message that includes the reference data row from the master database.

14. A method performed by a database system including a plurality of client databases and a master database, each client database having a subset of data from the master database, the method comprising:
receiving, by a processor, a data change request message from a requesting client database, the data change request message including change information identifying a proposed change, row identification information, and a before image; and
comparing, by the processor, the row identification information and the before image to corresponding information in the master database to identify a conflict;
wherein the comparing indicates a match between the row identification information, the before image, and the corresponding information in the master database;
the method further comprising:
modifying the master database pursuant to the change request; and
distributing a changed portion of the master database to each client database other than the requesting client database;
wherein distributing a changed portion of the master database to each client database other than the requesting client database comprises not distributing the changed portion of the master database to the requesting client database.

15. A method performed by a database system including a plurality of client databases and a master database, each client database having a subset of data from the master database, the method comprising:
receiving, by a processor, a data change request message from a requesting client database, the data change request message including change information identifying a proposed change, row identification information, and a before image; and
comparing, by the processor, the row identification information and the before image to corresponding information in the master database to identify a conflict;
wherein the comparing indicates a conflict; and
wherein the data change request message is an update request;
the method further comprising:
transmitting a refresh message to the requesting client database, the refresh message including a reference data row from the master database; and
after transmitting the refresh message, ignoring further messages from the requesting client database associated with the reference data row until an acknowledgement message is received from the requesting client database.

* * * * *